O. FERRIS.
Improvement in Coffee Pot Stands.
No. 120,425. Patented Oct. 31, 1871.
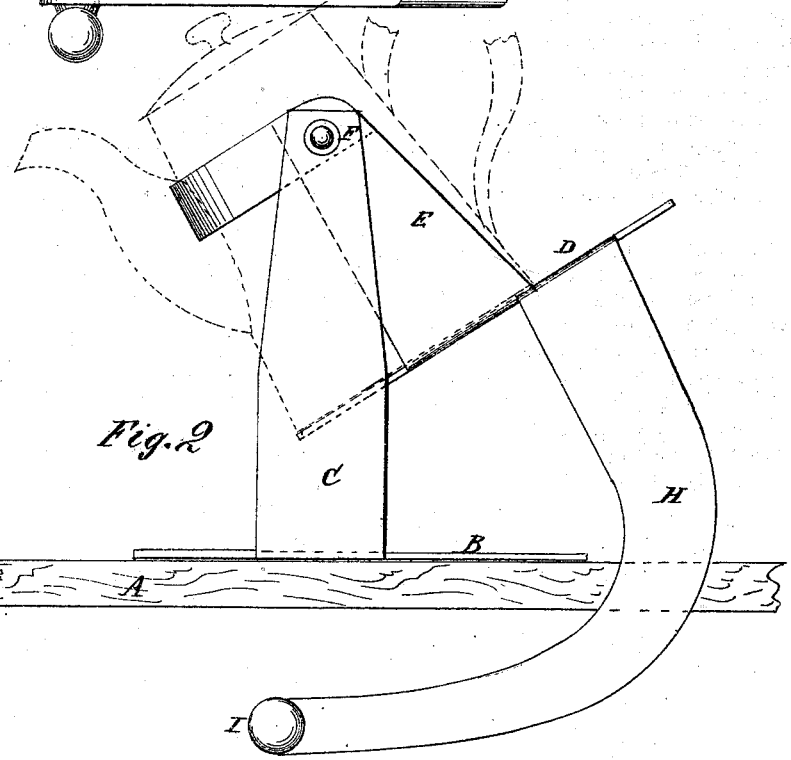

120,425

UNITED STATES PATENT OFFICE.

OLIVER FERRIS, OF PAWLING, NEW YORK.

IMPROVEMENT IN COFFEE-POT STANDS.

Specification forming part of Letters Patent No. 120,425, dated October 31, 1871.

*To all whom it may concern:*

Be it known that I, OLIVER FERRIS, of Pawling, in the county of Dutchess and State of New York, have invented a new and useful Improvement in Adjustable Coffee-Pot Stands; and I do hereby declare that the following is a full, clear, and exact description thereof, which will enable others skilled in the art to make and use the same, reference being had to the accompanying drawing forming part of this specification.

The object of this invention is to furnish convenient means for pouring coffee, tea, and other liquids from coffee or tea-pots or similar vessels without handling such vessels; and it consists in an adjustable stand or platform, arranged to operate as hereinafter shown and described.

In the accompanying drawing, Figure 1 is a top or plan view. Fig. 2 is a side view.

Similar letters of reference indicate corresponding parts.

A represents the table. B is the base-plate. C C are stands attached to and rising from the base B. D is the adjustable plate on which the vessel stands. This plate is suspended by means of arms E to the top ends of the stands C C, so that it will swing on the pivots F to an inclined position, as seen in Fig. 2. The vessel is supported and prevented from slipping off the plate D by curved stays G G, which are attached to the tops of the arms E, so that they move with the plate. H is the lever or handle by which the plate is operated. This lever is designed to hang down by the edge of the table, as represented in Fig. 2, so that the lady or attendant may pour out the coffee or tea by simply bearing down on the knob I.

By this arrangement the coffee-pot is elevated sufficiently to discharge all the liquid by simply inclining the plate, as described. This is a great relief to the female presiding at the table. The coffee is less likely to be agitated or roiled, as the movement of the pot is more gentle than when it is handled in the usual manner.

This adjustable coffee-pot stand may be made of tin, copper, or any suitable material, and of any size and proportions. Instead of the stays G G, there may be semicircular bands; and other alterations, as regards the details of construction, may be made without affecting my invention.

Having thus described my invention, I claim as new and desire to secure by Letters Patent—

The plate D, stays G G, and lever H, substantially as and for the purpose described.

The above specification of my invention signed by me this 15th day of August, 1871.

OLIVER FERRIS.

Witnesses:
   GEO. W. MABEE,
   L. S. MABEE. (136)